United States Patent

[11] 3,601,546

[72] Inventor David K. K. Lee
Chicago, Ill.
[21] Appl. No. 7,926
[22] Filed Feb. 2, 1970
[45] Patented Aug. 24, 1971
[73] Assignee GTE Automatic Electric Laboratories Incorporated

[54] SELECTION OF A TIME MULTIPLEX SHARED REGISTER AND USE OF A COMMON DATA BUFFER IN A COMMUNICATION SWITCHING SYSTEM
5 Claims, 6 Drawing Figs.

[52] U.S. Cl. .......... 179/18 EB
[51] Int. Cl. .......... H04m 3/22
[50] Field of Search .......... 179/18 EB, 18 ES

[56] References Cited
UNITED STATES PATENTS 3,328,534 6/1967 Murphy et al. .......... 179/18 EA

*Primary Examiner*—Kathleen H. Claffy
*Assistant Examiner*—David L. Stewart
*Attorneys*—Cyril A. Krenzer, K. Mullerheim and B. E. Franz ABSTRACT: Each register-sender is assigned an individual junctor, an area of memory, and a recurring time slot of a multiplex cycle; and each during its time slot has use of common process control logic circuits which include a sequence state register. The register-sender subsystem includes a data buffer for communication with a marker. Upon origination of a call the marker sends a call-for-service signal to a seizure gate of the data buffer. Another input of the seizure gate is the idle state output of the sequence state register, so that when the time slot of an idle register-sender occurs, the output of the gate sets a "key-to-marker" flip-flop and a "busy" flip-flop. This enables call data to be received from the marker and the sequence state to be advanced for that register-sender. The "key-to-marker" flip-flop is reset at the end of the time slot, and again set during each occurrence thereof, while the "busy" flip-flop remains set, until the data reception is finished. A register-sender may also initiate seizure of the data buffer via the process control sequence state register during a call to send data to the marker. A "conditional busy" flip-flop permits queueing of one register-sender for use of the data buffer.

PATENTED AUG 24 1971

3,601,546

SHEET 1 OF 4

FIG. I

INVENTOR
DAVID K.K. LEE

BY *Bernard E. Franz*
ATTORNEY

SELECTION OF A TIME MULTIPLEX SHARED REGISTER AND USE OF A COMMON DATA BUFFER IN A COMMUNICATION SWITCHING SYSTEM

BACKGROUND OF THE INVENTION

1. Field of the Invention

This invention relates to selection and seizure of an idle register in a communication switching system in which the registers share common logic circuits on a time division multiplex basis, each register having an individual storage area in a memory and an individual register junctor; and also to the use of a common data buffer for supplying call information to the selected register.

2. Description of the Prior Art

Communication switching systems with registers shared on a time division multiplex basis are well known. In such systems each register is assigned an individual area of a memory, and the registers are individually associated with cyclically recurring time slot signals; with each register during its individual time slot having the information from the memory and other input information supplied to the common logic circuits for processing and then stored back in the memory and to output circuits. In systems using a marker controlled space divided switching network, such as that disclosed in Spellnes U.S. Pat. No. 3,170,041, each register also has an individual space divided register junctor as an interface unit between the switching network and marker and the common logic circuits, the junctor being coupled to the common logic circuits during its time slot. For selection of an idle register each junctor has an idle test lead for connection to a scanner in the marker. In systems using a time division network, such as that disclosed in Faulkner et al. U.S. Pat. No. 3,105,699, one or more idle registers (link circuits) is arranged to supply scanning pulses to the line circuits to search for a call request. Many systems require the use of an allotter to designate which register is to be used for the next call. In most of the prior art systems, one of the items of information stored in the memory is a sequence state digit which comprises a plurality of bits to indicate the state of the call, such as idle, dialing, etc. In most register systems using a memory, some arrangement must also be provided for supplying originating call information such as the class of service and identity of the calling line, into the memory.

SUMMARY OF THE INVENTION

One object of the invention is to provide a simple and effective arrangement for seizing an idle register for an originating call, in a time division multiplex register system.

According to the invention, a data buffer unit coupled between the marker and the register common logic circuits includes a "key-to-marker" flip-flop which is initially set for a call during the time slot of an idle register via a seizure gate having inputs which include a call request lead from the marker and a lead from the common logic circuits for the decoded idle sequence state. Thereby when the marker has an originating call requesting service, during successive time slots. the idle state sequence is examined, and when an idle register is found the "key-to-marker" bistable device is set. After seizure, originating call data from the marker is loaded in the data buffer, and at the end of the time slot the sequence state is advanced to a state indicating the origination of a call.

Other features relate to the cooperation between the data buffer and the common logic circuits during the originating call sequence, and also to additional sequence states in which the common control circuits call for the service of the marker and seize the data buffer.

CROSS-REFERENCES TO RELATED APPLICATIONS

This invention may be incorporated in the Communication Switching System described in U.S. Pat. No. 3,328,534 by R.

J. Murphy et al. herein referred to as The System Patent. Some of the disclosure therein is closely related to the invention claimed herein, see for example FIGS. 25 and 26, the description at column 36, lines 2–4, and in claim 10 at column 45, lines 9–11; but the specific invention claimed herein is not disclosed in that patent.

Three copending U.S. applications for a Digital Control and Memory Arrangement, Ser. No. 667,170 by H. L. Wirsing and W. C. Miller, now U.S. Pat. No. 3,533,073 issued Oct. 6, 1970 filed Sept. 12, 1967; Ser. No. 690,356 by G. P. Minarcik, filed Dec. 13, 1967, now U.S. Pat. No. 3,533,080 issued Oct. 6, 1970 and Ser. No. 690,348 by D. K. K. Lee, J. R. Vande Wege and W. R. Wedmore, filed Dec. 13, 1967, now U.S. Pat. No. 3,533,079, issued Oct. 1970, hereinafter referred to as the Memory Sharing patent applications, disclose an arrangement of the common control equipment into three subsystems sharing a common memory, and disclose details of the generation of the time slot pulses for the registers.

The arrangement for data communication between the marker and the register subsystem, including the data buffer, is disclosed in a copending U.S. application for Data Communication Via Direct-Coupled Individual Parallel Conductors, Ser. No. 829,525, filed June 2, 1969, now U.S. Pat. No. 3,550,083, issued Dec. 20, 1970, hereinafter referred to as the Data Communication patent application. My invention is partly disclosed therein, but such disclosure was derived from me for incorporation in that application, and the basic design of the apparatus of the data buffer was substantially completed before Heldman and Kobylar commenced their activities in improving the design to insure reliable communication of the data between the marker and the data buffer.

DESCRIPTION OF THE PREFERRED EMBODIMENT

Figure 1:
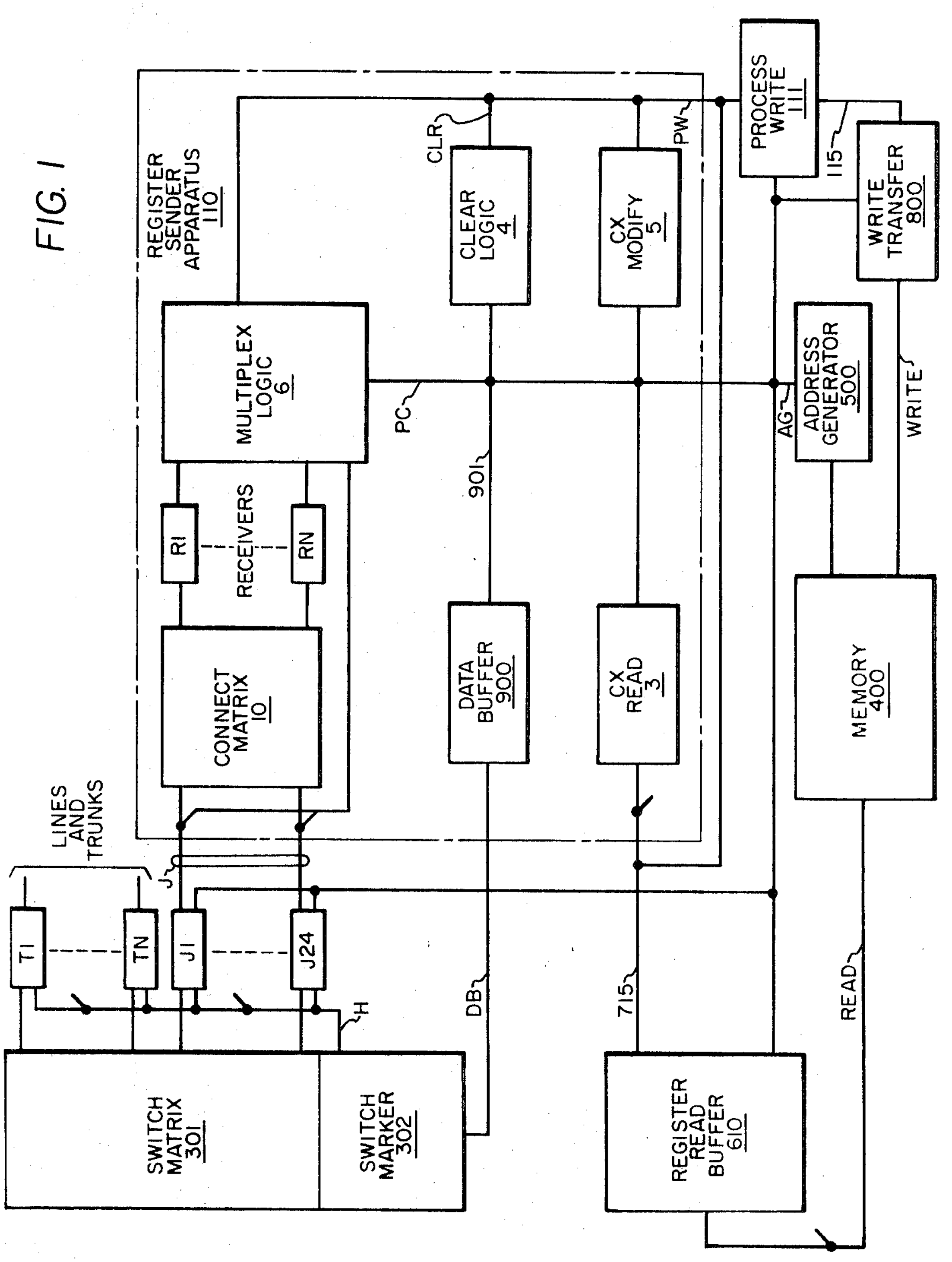
FIG. 1 is a single line block diagram of a portion of the communication switching system including the switching network and marker and the register sender apparatus.

The system apparatus and operation is described in the System patent and in the Memory Sharing and the Data Communication patent applications. Briefly the switch matrix 301 has a plurality of terminal circuits including a variety of line and trunk circuits T1-TN, and the register-sender junctors J1-J24. A switch marker 302 has connections to the switch matrix 301, connections via a set of common conductors H to the trunk and junctor circuits for the transmission of supervisory and control information, and connections via a set of conductors DB to the common control circuits. The remaining apparatus shown in FIG. 1 is a portion of the common control apparatus of the system. The register-sender subsystem comprises a register real buffer 610, the register-sender apparatus 110, and process write circuits 111. There are also a translator and route selector subsystem and a trunk scanner subsystem not shown in FIG. 1. Common to these subsystems is a memory 400, an address generator 500 and write transfer circuits 800.

The register-sender apparatus 110 includes a connect matrix 10 for interconnecting the junctors J1-J24 to local and trunk receivers and transceivers R1-RN which are of a multifrequency type, as shown in FIG. 25 of the System patent. The multiplex logic circuits 6 couple the junctors and receivers to the common logic circuits during the corresponding time slots. The data buffer 900 is coupled via the data bus DB to the switch marker 302 and by a set of conductors 901 to the common logic circuits. The common logic circuits include the register sequence state read and modify circuits 3 and 5, clear logic 4, and several other call processing logic circuits not shown. These common logic circuits are associated with each register during its time slot, whereas the data buffer 900 and receivers R1-RN are each associated with a register during complete multiplex cycles until a job is finished.

The layout of the memory 400 is shown on sheet 25 of the drawings of the System patent, with the register-sender memory layouts for one register shown in FIG. 26 thereof. Each word of the memory comprises 40 bits of call information and four parity bits, the 40 information bits being arranged in 10 digits A-J of four bits each. Each register has eight words in the memory, word one being for register processing control information, of which six bits J1-I2 are for the storage of the register sequence state, designated CX. The address generator 500 is described in detail in said Memory Sharing applications. The register portion of the address generator supplies signals for access to a different word during each memory word time, which in this system has a duration of 160 microseconds, divided into 16 intervals TX0–TX15 of 10 microseconds each. During each register word time, one word from the register section of the memory is read during the interval TX4 and transferred into the register read buffer 610 during interval TX5; and during the interval TX1 of the next cycle the word is written back into the same location of the memory via the process write circuits 111 and the write transfer circuits 800.

Each register is assigned 10 word times or subtime slots each cycle with the first eight subtime slots used for the words one through eight in sequence, and the ninth and tenth subtime slots used for repeated access of the words one and two respectively for modification of the information therein. The 10 subtime slots comprise a time slot of 1.6 milliseconds; and 24 registers, a complete multiplex cycle has a duration of 38.4 milliseconds. The time slots are designated RTS1–RTS24. The address generator during each subtime slot supplies a register word pulse, which for the 10 subtime slots are designated RWP1–RWP10. During interval TX2 of each of these word pulses a register latch pulse is generated, these pulses being designated RLP1–RLP10. The latch pulse RLP10 is used to reset certain latches in the common control at the end of the register time slot, thereby not leaving any residual information for the next register-sender junctor. The register time slot pulses, register word pulses, and register latch pulses are supplied to the various units of the register-sender subsystem via the set of conductors AG.

The register read buffer 610 comprises a set of 40 flip-flops lesignated RPA1–RPJ4 corresponding to the 40 flip-flops designated RPA1–RPJ4 corresponding to the forty information bits in each word of memory. The outputs designated RA1–RJ4 from these flip-flops are supplied via a set of conductors 715 to the common logic circuits of the register-sender apparatus 110. The conductors 7!5 are also connected directly to the process write circuits 111 to rewrite the information in case there is no modification thereof. When the information is to be modified, write and inhibit signals via the set of conductors PW are supplied to the process write circuits 111 during the respective subtime slots.

DATA BUFFER (FIG. 2)

Figure 2:
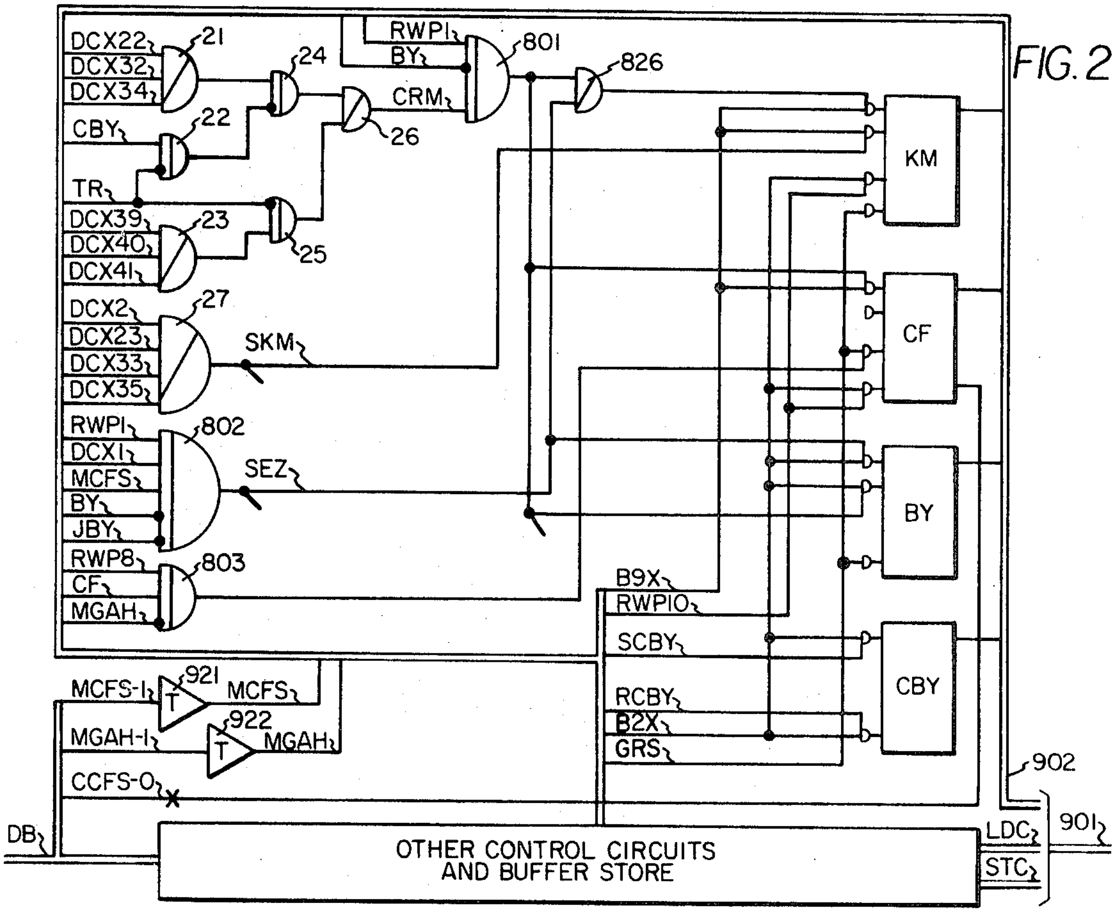
FIG. 2 is a functional block diagram of a portion of the data buffer with the remainder shown as a block at the bottom.

A portion of the data buffer 900, relating to the seizure and holding thereof, is shown in FIG. 2. Except for gates 21–27 and the flip-flop CBY, the circuits along with the other control circuits and the buffer flip-flops for storage of data are shown in said Data Communication patent application, FIGS. 8 and 9, hereinafter referred to as FIGS. DC8 and DC9. The flip-flop KM is the key to the marker, used to indicate which register is using the data buffer for communication with the marker. The data buffer is seized by setting the flip-flop KM via OR gate 826, and setting the busy flip-flop By during the same subtime slot. The flip-flop KM is reset during the last subtime slot of that register by the signal on lead RWP10. It is again set during the time slot of that register in each subsequent cycle via a signal on lead SKM until the particular communication task is completed. Thus the output of flip-flop KM may be used to indicate in the common logic circuits the occurrence of the time slot of the register which is in communication with the marker.

The flip-flop CF is used for seizure of the data buffer for communication with the marker by the common logic during the processing of calls, via a signal from gate 801. The same signal also is used to set the flip-flops KM and BY. The output of flip-flop CF is used to transmit a signal to the marker that the common control apparatus is calling for service, via lead CCFS–0. The flip-flop BY is used as a busy indication, and remains set throughout the multiplex cycle to prevent seizure of the data buffer for other calls.

The flip-flop CBY indicates conditional busy, which is an indication that another register already processing a call is awaiting the use of the data buffer.

The input circuits of the flip-flops comprise four coincidence gates shown as small semicircles at the left-hand side, with unused ones being omitted from the drawing for simplicity. The upper two gates are to set the flip-flop, and the lower two to reset it. Each coincidence gate comprises an AC input shown at the center of the left-hand side, and a DC input shown at either the upper or lower side. The AC input signals are supplied via gated pulse amplifiers shown in FIG. 8 of the Data Communication patent application. A pulse on lead B2X occurs during the middle of interval TX2, and a pulse on lead B9X occurs during the middle of interval TX9, of every subtime slot. A pulse appears on lead GRS to reset the data buffer when a communication task is completed.

The functions of the AND and OR gates shown in FIG. 2 will be explained in conjunction with the operation of the circuits.

SEQUENCE STATE BUFFER (FIG. 3)

Figure 3:
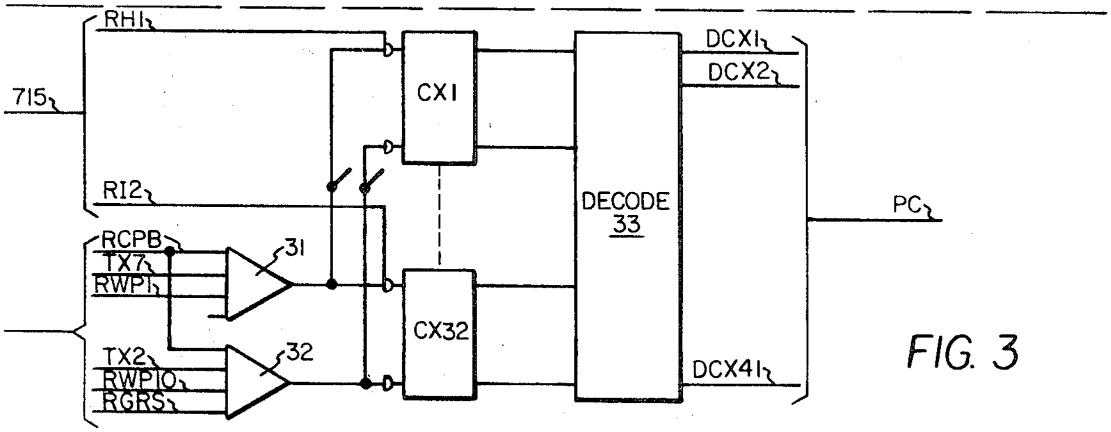
FIG. 3 is a functional block diagram of the sequence state read and decode circuits.
Figure 4:
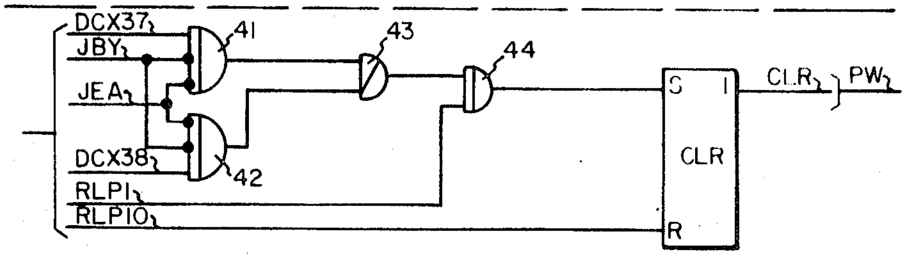
FIG. 4 is a functional block diagram of the clear logic.

The processor control sequence states for the register-sender subsystem are placed during each time slot in six flip-flops designated CX1, CX2, CX4, CX8, CX16 and CX32, the first and last being shown in FIG. 3. This information is stored for each register in memory word one, in the six bits H1-I2. A gated pulse amplifier is enabled during interval TX7 of the register word pulse RWP1 to pass the clock pulse B on lead RCPB, which occurs in the middle of each interval, to transfer the information from the register read buffer 610 into the CX flip-flops. A gated pulse amplifier 32 is enabled during interval TX2 of the register word pulse RWP10 to pass the pulse on lead RCPB to reset the CX flip-flops. The output of the flip-flops is decoded by logic 33 to provide a signal on one out of 41 leads DCX1–DCX41.

State DCX1 is the register idle state, DCX2 is the originating-seized-by-marker state, DCX3 is a state for checking certain contacts and other circuits in the register junctor. States DCX4–DCX21 are used for processing the call including handling of the class mark, receiving digits, and translation. State DCX22 is used to request the marker to make a sender-to-trunk connection, and state DCX23 indicates that the marker is in the process of making that connection. States DCX24–DCX31 occur during sending. State DCX32 is a request to the marker for a loop-around connection, which is a connection of a special insertion junctor for certain types of calls, and state DCX33 indicates that the marker is in the process of making the connection. State DCX34 is a state to request the marker for a final connection, and state DCX35 indicates that the marker is in the process of making that connection. State DCX36 is used to indicate that the register-sender junctor should be disconnected, state DCX37 is for a down check, state DCX38 is a state indicating a trouble condition, and states DCX39-41 are states for awaiting use of the data buffer 900.

CLEAR LOGIC (FIG. 4)

The latch CLR is used to supply a signal to the process write circuit 111 to indicate that the register should be cleared and returned to the idle state. The input logic provides for setting this latch during either of states DCX37 or DCX38. The latch is reset at the end of the time slot by the signal on lead RLP 10.

SEQUENCE STATE MODIFICATION LOGIC (FIG. 5)

Figure 5:
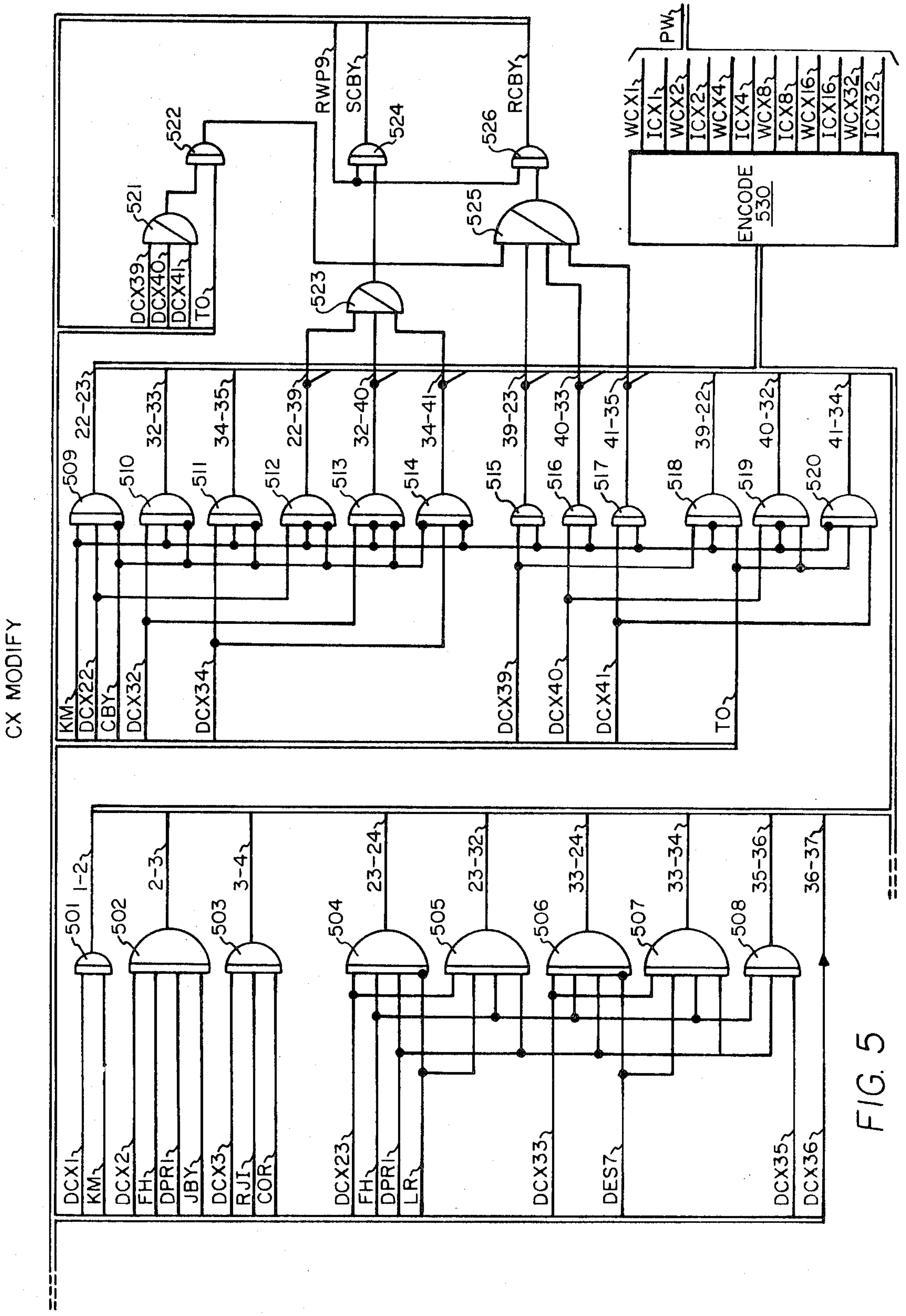
FIG. 5 is a functional block diagram of the sequence state modify circuits.

The CX modify circuits 5 provide logic for controlling the advance or jump from one sequence state to another, under appropriate logic conditions. FIG. 5 shows only that portion of the logic relevant to the sequence states concerned with use of the data buffer 900. The output lead from each gate is designated by two numbers separated by a hyphen to indicate the present state and the state to be entered. The outputs are encoded by logic circuits 530 to provide write or inhibit signals for each of the six bits which are to be changed in the binary coding of the states.

JUNCTORS AND MULTIPLEX LOGIC (FIG. 6)

Each of the 24 junctors J1-J24 comprises a register section and a sender section; and each includes a relay portion for control of the transmission and control conductors to the switch matrix and marker and to the connect matrix, and an electronic portion for interface via the multiplex logic of the common logic circuits. The electronic portion includes several latches for receiving multiplex signals from the multiplex logic, one of which is shown as latch HR. There are also several latches for supplying signals to the multiplex logic, one of which is shown as latch BY1. The 24 time slot signals RTS1–RTS24 are supplied to the respective junctors J1–J24, and also to gates in the multiplex logic 6. The latch HR is a hold-register latch, which via a relay driver 647 operates a relay HR1. When this latch is to be set a signal is received on lead SHR during the register's time slot to AND gate 644, and the time slot signal is supplied via gate 642 during intervals TX2 to another input of gate 644 to supply a signal to the set input of the latch. The signal on lead SHR is only received during the eighth subtime slot. The latch remains set throughout the multiplex cycles until the next occurrence of this register's time slot, when it is reset during the seventh subtime slot via coincidence of the time slot signal, a latch pulse signal on lead RLP7 and the interval signal TX2 via AND gates 642 and 643, and OR gate 645. However if the register is still to be held a signal will appear during the eighth subtime slot again on lead SHR, so that the latch remains reset only for an interval equal to one subtime slot or 160 microseconds. The relay HR1 holds operated for this interval. The signals from gate 642 and 643 are also supplied to input circuits to other latches receiving signals from the multiplex logic.

The relay HR1 has several sets of contacts, one of which supplies a ground signal to an input of NOR gate 646. The other input of this NOR gate is the time slot signal. When both inputs of the gate are false (ground potential), the output is true to set the latch BY1; which can occur only during portions of the multiplex cycle other than its own time slot. Gate 641 is inhibited during the junctor's time slot, but during other time slots supplies an output signal in response to the signal RLP7 to reset the latch BY1 and other latches for supplying output information from the junctor circuit. Thus if the relay HR1 is operated the signal via its contacts and gate 646 will insure that the latch is set just before the beginning of its time slot, and the latch is inhibited from changing state for the duration of the entire time slot.

The multiplex logic 6 includes gates for supplying multiplex signals to and from the junctors during their respective time slots. For example 24 gates 601-624 receive the signals BY1–BY24 from the 24 junctors respectively, and each is enabled by its respective one of time slot signals RTS1–RTS24 to supply outputs via the OR gate 625 to lead JBY. There are also gates for receiving signals concerning the state of the junctors as stored in the memory and supplying them to their respective junctor circuits. For example the hold register signal is stored in bit A1 of word eight for each register and is supplied via gates 633 and 634 to lead SHR. Other inputs of these gates provide for supplying the signal also when the item of information is originally written via lead WHR, and when it is erased via lead IHR the signal is inhibited.

OPERATION

Origination of Call

Figure 6:
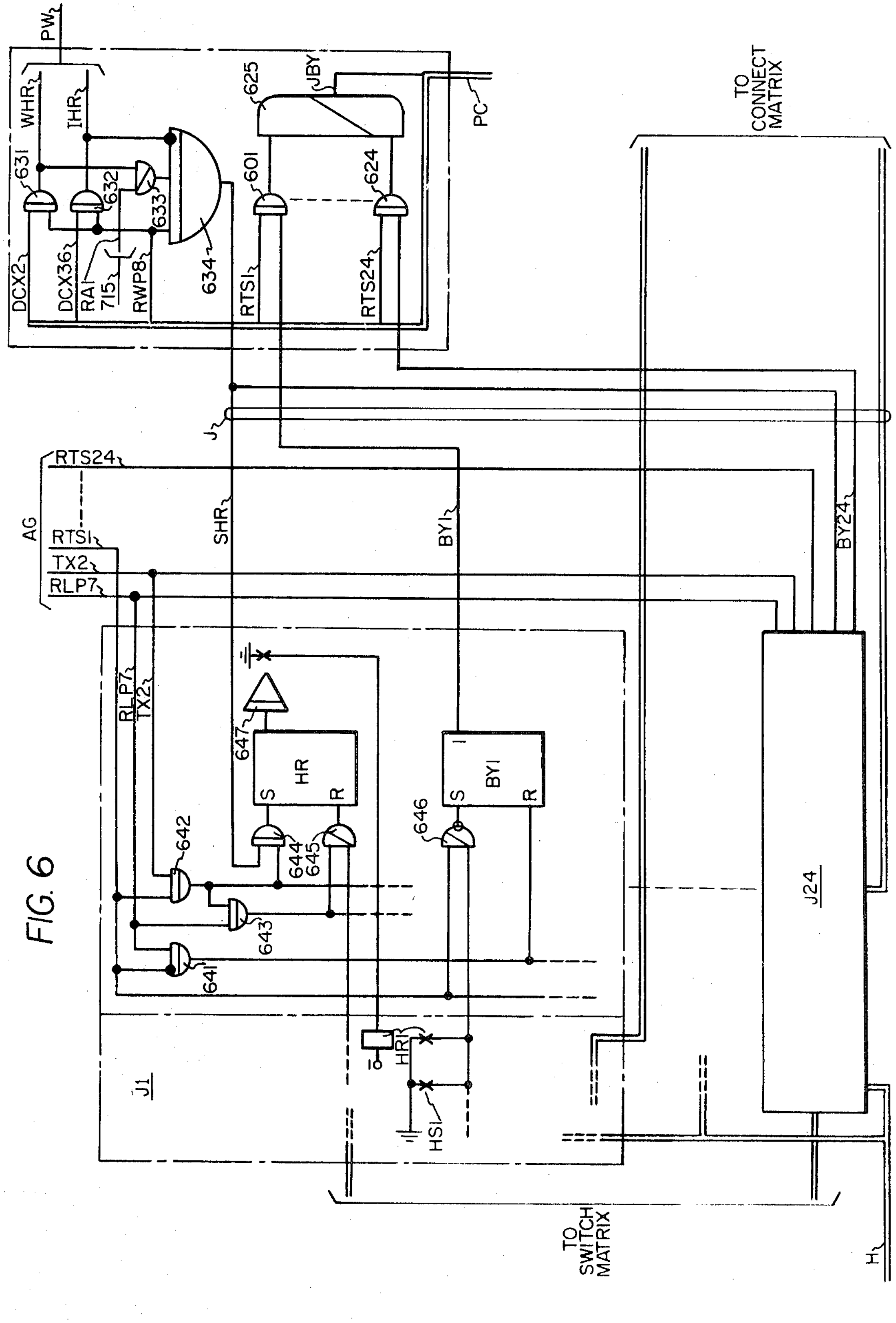
FIG. 6 is a functional block diagram of a portion of the register junctors and of the multiplex logic associated therewith.

Assume that a call is originated from a local line which may be served for example by the termination circuit T1, shown in FIG. 1. The origination is detected and the equipment number of the circuit T1 is recorded in the switch marker 302. The switch marker then supplies a signal on lead MCFS–1 of bus DB to the data buffer (FIG. 2), and the signal is forwarded via test gate 921 and lead MCFS as an input to gate 802. If the data buffer is already busy a signal on lead BY inhibits this gate, but otherwise it will proceed to effectively scan the 24 registers to find an idle one. During the time slot of an idle register the signal on lead DCX1 from the sequence state circuit in FIG. 3 is true. At the same time the multiplex signal JBY from FIG. 6 should be false. During each time slot, in the first subtime slot as indicated by the signal on lead RWP1, each register is effectively checked for the idle state. When an idle register is found the signal at the output of gate 802 on lead SEZ becomes true, which via gate 826 sets the flip-flop KM when enabled during interval TX9 by the pulse on lead B9X. The signal from lead SEZ also sets the flip-flop BY when enabled during interval TX2 via the pulse on lead B2X, to mark the data buffer busy. The signal SEZ is also supplied to other control flip-flops (see FIG. 8 of the Data Communication application ) to permit the data buffer to receive data from the marker.

The originating number information is received from the marker into the data buffer flip-flops, and during the register word pulse RWP5, this information is stored via conductors STC in word five of the memory. Then during subsequent subtime slots the register number is set in the flip-flops of the data buffer and sent back to the marker along with the originating number. The marker proceeds to establish a connection between the originating terminal T1 and the register junctor terminal which we will assume to be J1.

Referring to FIG. 5, the signals DCX1 and KM at gate 501 produce the signal 1–2 which in the encoding circuits 530 generate signals WCX2 and ICX1. During the ninth subtime slot the process write circuits 111 cause the new state to be written into the bits H1–I2 of word one, with bit H2 true and the other five bits false.

During the tenth subtime slot the signal RWP10 (FIG. 2) resets the flip-flop KM This completes the time slot for this register for the first time. During the occurrence of the time slot for this register in the next cycle the sequence state in FIG. 3 is DCX2. This state indicates that there is an originating call, with this register and its junctor seized by the marker. This state is used to load information from the marker, and to wait for the marker to connect the originating line to the junctor terminal of the idle register selected.

During the register's first time slot in state DCX2, during the occurrence of the subtime slot signal RWP8 a signal is supplied via gate 631 (FIG. 6) to generate a hold register command. This signal is forwarded via conductors PW to the process write circuits 111 to write this bit into location A1 of word eight, and at the same time it is supplied via gates 633 and 634 to lead SHR, and received in the junctor circuit J1 to set the flip-flop HR. This operates the read relay HR1, which via its contacts supplies ground to set the flip-flops BY1 after the end of the time slot. During successive time slots the output from latch BY1 via gates 601 and 625 supplies the signal JBY to indicate that the junctor is busy, for the duration of the call.

In the data buffer the signal on lead DCX2 via gate 27 supplies a signal on lead SKM to set the flip-flop KM, which indicates occurrence of the time slot of the register using the data buffer. At the end of the time slot the signal on lead RWP10 again resets the flip-flop KM. This action continues through successive cycles, flip-flop KM being set only during the time slot of this particular register, and the flip-flop BY remaining continuously set, until data is received from the marker with a message designating either successful completion of the connection, or some other message. The message is received in flip-flops CPR1, CPR, CPR4, CPR8 (see FIG. DC9) with the successful completion message being the setting of the flip-flop CPR1 only, decoded as the signal DPR1. The receipt of the message successfully will also cause a flip-flop FH (FIG. DC8) of the data register to be set.

The coincidence of the signals DCX2, FH, DPR1 and JBY at gate 502 (FIG. 5) produces the signal 2–3 to advance the sequence to the next state.

Another possible exit from state DCX2 is to state DCX36 (not shown in FIG. 5) in response to coincidence of the signals FH and $\overline{\text{DPR1}}$, which means that a message was received from the marker with some indication other than successful completion of the connection, such as an abandoned call or some difficulty. The exit to state DCX36 can also be produced by a time out signal from the common logic circuits.

Note that state DCX2 is designated as a guarded state, meaning that only one register can be in this state at any particular time; consequently, the data buffer can only be used by this particular register until the switch marker is through with the call and has returned a message.

During state DCX3 a check is made to determine whether the switch marker has actually completed the call successfully and that the call has not been abandoned. These checks are accomplished by signals detected in the junctor circuit and used to set a latch not shown in FIG. 6 which is multiplexed by circuits not shown in logic 6 to produce signals RJ1 and COR. These signals at gate 503 (FIG. 5) produce the signal 3–4 to advance the sequence state.

During states DCX4–DCX22 a class mark translation is obtained, one of the receivers R1–RN (FIG. 1) is connected via matrix 10 to the junctor J1, dial tone is transmitted via the junctor and the switch matrix to the calling line, dialed digits are received in the connected receiver and supplied via the multiplex logic 6 and the process write circuits 111 into the memory, and translations are obtained. It is assumed that this is an outgoing call, so a multifrequency transceiver is selected from the circuits R1–RN and connected via the matrix 10 to the junctor J1. State DCX22 is to request the marker to make a sender-to-trunk connection. The identity of the selected outgoing trunk circuit obtained during the translation process has been stored in memory.

Referring to FIG. 2, the signal DCX22 via gate 21 provides the request for marker signal RM at an input of gate 24. Unless inhibited by a signal CBY via gate 22, this signal via gate 26 supplies the common request for marker signal CRM at an input of gate 801. During the occurrence of the subtime slot signal RWP1, if the data buffer is not busy, a signal from the output of gate 801 via gate 826 sets the flip-flop KM, and also sets the flip-flops CF and BY.

If the data buffer is busy the signal BY inhibits gate 801. Referring to FIG. 5, with the signals KM and CBY not true, the signal DCX22 enables gate 512 to produce a signal 22–39. This signal via gate 523 during the occurrence of the subtime slot signal RWP9 at gate 524 supplies the signal SCBY, which sets the flip-flop CBY in FIG. 2, and via the encode circuits 530 causes the sequence to jump to state DCX39. This reserves the data buffer for next use by this register. The states DCX39, DCX40 and DCX41 are guarded states with only one register permitted to be in one of these states at a time. This is accomplished by the signal CBY inhibiting the gates 512, 513 and 514. When the data buffer becomes idle the signal DCX39 via gates 23, 25, 26, 801, and 826 sets the flip-flops KM, CF and BY for seizure thereof.

The signal from gate 801 also sets the send flip-flop SD (FIG. DC8). The output from flip-flop CF transmits a signal via conductor CCFS–0 of the data bus DB to extend the call-for-service signal to the marker. The sender terminal identity for junctor J1 and the terminating trunk number are loaded from memory into the data buffer, and the information is transmitted to the marker. During the ninth subtime slot, a command is generated from either gate 509 or 515 to advance the sequence state to DCX23, which is encoded via the circuits 530 and written into the memory via the process write circuits 111. If the signal 39–23 is received from gate 515, then via gates 525 and 526 the signal RCBY resets the flip-flop CBY. During the tenth subtime slot RWP10 resets flip-flop KM.

During state DCX23 the marker is in the process of making the sender-to-trunk connection. In each multiplex cycle during the time slot for this register the signal DCX23 via gate 27 sets the flip-flop KM, and at the end of the time slot the flip-flop is reset. When the connection is established the marker returns a message which indicates the successful completion decoded as signal DPR1, and the flip-flop FH is set. These signals are supplied to gates 504 and 505. Since a loop-around junctor is not required for this call the signal on lead LR is false. Therefore gate 504 produces the signal 23–24 to advance the sequence state to DCX24.

Sending to the distant office commences during state DCX24, reaches state DCX31 at the end of send, and from there enters sequence state DCX34.

In obtaining the service of the marker for a final connection, DCX34 is the request service state, DCX35 is the marker in process of making the connection state, and DCX41 is the conditional busy state if required; the operation in these states being essentially analogous to states DCX22, DCX23, and DCX39 respectively. In FIG. 5, the gates involved are 511, 514 and 517. The marker establishes a connection between the calling line terminal and the outgoing trunk terminal. After the message indicating successful completion of the connection is received by the data buffer, gate 508 is enabled to advance the sequence to state DCX36.

State DXC36 is used to disconnect the junctor. At gate 632 the signal DCX36 in coincidence with the subtime slot signal RWP8 produces a signal IHR to erase the hold-register condition. This signal is forwarded via the conductors PW to the process write circuits, and at the same time inhibits gate 634 to prevent the latch HR from setting. Similarly circuits not shown cause a latch HS for the sender to be inhibited from setting to release the sender terminal. With the latch HR remaining reset, the relay HR1 is deenergized to release the register terminal, and similarly the latch HS and relay HS1, of which only a set of contacts are shown, are released. Note that the relays in the junctor circuit are deenergized during the time slot, but do not complete their release until somewhat later. After contacts of relays HR1 and HS1 open, the latch BY1 will not be set. At the end of the time slot the sequence always advances to state DCX37 as indicated by a line in the lower left of FIG. 5.

During state DCX37 a down check is made. At this time the signal JBY and another multiplex signal JEA from the junctor should be false, and via gates 41, 43 and 44 set the latch CLR to initiate clearing the register. The signal CLR to the process write circuits 111 causes all of the bits of all of the words of the memory for this register to be set to zero except for the sequence state digit, which has the bit H1 set to one, to provide the code for the idle sequence state DCX1. If the signals JBY and JEA are not both false during the state DCX37, then the sequence is advanced to a special state DCX38, and when the signals do both become false the latch CLR is set via gate 42. At the end of the time slot the signal RLP10 resets the latch CLR. The register and its junctor circuit are now in the idle state.

What we claim is:

1. In a communication switching system comprising a plurality of register junctors, processing circuits common to the register junctors, a memory having a plurality of storage elements organized into sets which are individually associated with the register junctors;

sequential addressing means providing cyclically recurring time slots individual to the register junctors and associated sets of the memory;

means including the address means for causing the processing circuits to receive information from each register junctor and the associated set of the memory, to process the information and to write the information into said set, during each occurrence of the corresponding time slot;

each said set of the memory including a subset for storing a state-indicating digit having a plurality of possible values, one of which is an idle-indicating value, said processing circuits including a state-indicating store 3 connected to receive and store state-indicating information from said subset of each set during the corresponding time slot, said store having an idle-state output DCX1 for indicating when said idle-indicating value is true, a data buffer unit 900 having means for receiving originating call information for storage in the memory;

the improvement wherein said data buffer unit includes a "-key" bistable device KM, a call request lead MCFS seizure means 802 coupled to the call request lead, to said idle-state output from said store, and to an input of said device; the seizure means being operative responsive to coincidence of a call request signal on said lead and a signal indicating the idle value on said idle-state output to produce a seizure signal which is effective to set said bistable device, and means 501, 530, 111 in the processing circuits responsive to said "key" bistable device being set to change the value of the state-indicating digit in the set of the memory corresponding to the current time slot to an "originating seized" state DCX2;

whereby a call request signal causes scanning of the register junctors by checking the value of the state-indicating digit during each time slot to find and seize an idle one.

2. In a communication switching system, the combination as claimed in claim 1, wherein the system includes a switching network and marker, with the marker coupled to said data buffer unit via a data bus comprising a plurality of conductors, one of the conductors being said call request lead;

wherein said data buffer unit is operative following said seizure signal to receive originating call information from the marker, and to return information including the identity of the register junctor corresponding to the time slot occurring at the time of seizure, for use by the marker to establish a connection through the switching network to that register junctor;

wherein the data buffer unit further includes a "busy" bistable device and means to set it responsive to said seizure signal, means to reset the "key" bistable device before the end of the time slot, and means to set it again responsive to an "originating seized" state signal from said state-indicating store near the beginning of the next occurrence of the time slot of the seized register junctor to identify which junctor is using the data buffer unit, while the "-busy" bistable device remains continuously set to prevent use of the data buffer unit for other calls by inhibiting said seizure means;

means for the data buffer unit to receive a data message from the marker after the connection through the switching network to the register junctor has been completed, and means responsive to receipt of the message to cause the value of the state-indicating digit to be advanced, and means to clear the data buffer unit including resetting the "busy" bistable device.

3. In a communication switching system, the combination as claimed in claim 2, wherein the call processing circuits include means effective during the processing of a call to set the value of the state-indicating digit to a "request-marker" state, wherein the data buffer unit further a "common call" bistable device CF having an output connected to a common call request lead of the data bus to the marker, gate means having an input from the "request-marker" state output from said state-indicating store, and an inhibit input from the "busy" bistable device, operative responsive to the "request-marker" signal and the data buffer unit being idle to set the "Key," the "busy,", and the "-common call" bistable devices;

means to load call information from the memory into the data buffer unit and to send it to the marker for use to establish a connection through the switching network;

means in the processing circuits responsive to the "key" bistable device being set to change the value of the state-indicating digit to a "marker-making-connection" state, means responsive to that state signal from the state-indicating store to set the "key" bistable device at the beginning of each occurrence of the same time slot, it being reset at the end of the time slot; and means to receive a data message which causes the value of the state-indicating digit to be advanced, and the data buffer unit to be cleared.

4. In a communication switching system, the combination as claimed in claim 3, wherein the data buffer unit further includes a "conditional busy" bistable device, means responsive to said "request-marker" state signal and the "key" bistable device not being set to set the "conditional busy" device and to change the value of the state-indicating digit to a "waiting" state, means in the data buffer responsive to the "conditional busy" device being set to inhibit seizure in response to "request marker" signals, and means responsive to coincidence of the "waiting" state signal and the "busy" device being reset to seize the data buffer unit be setting the "Key," "busy" and "common call" devices.

5. In a communication switching system, the combination as claimed in claim 4, wherein there are a plurality of types of connections for which a marker request may be initiated from the processing circuits, and for each type there are separate values of the state-indicating digit for "request marker," "-marker-making-connection," and "waiting."

UNITED STATES PATENT OFFICE
CERTIFICATE OF CORRECTION

Patent No. 3,601,546 Dated August 24, 1971

Inventor(s) DAVID K. K. LEE

It is certified that error appears in the above-identified patent and that said Letters Patent are hereby corrected as shown below:

Claim 1, Column 9, line 16, place "3" in parentheses
line 19, place "DCX1" in parentheses
line 21, place "900" in parentheses
line 24, place "KM" in parentheses
line 24, place "MCFS" in parentheses
line 25, place "802" in parentheses
line 32, place "501, 530, 111" in parentheses
line 36, place "DCX2" in parentheses Claim 3, Column 10, line 17, after "further" add -- includes --

Claim 4, Column 10, line 49, "be" should be -- by --

Signed and sealed this 27th day of March 1973.

(SEAL)
Attest:

EDWARD M.FLETCHER,JR.
Attesting Officer

ROBERT GOTTSCHALK
Commissioner of Patents